Oct. 26, 1971   H. E. TEMPLE   3,615,001
HIGH SPEED TRANSFER SYSTEM
Original Filed Nov. 19, 1965   7 Sheets-Sheet 1

FIG. 1

INVENTOR.
HIRAM E. TEMPLE
BY
Learman, Learman & McCulloch
ATTORNEYS

United States Patent Office 3,615,001
Patented Oct. 26, 1971

3,615,001
HIGH SPEED TRANSFER SYSTEM
Hiram E. Temple, Saginaw, Mich., assignor to Baker Perkins Inc., Saginaw, Mich.
Original application Nov. 19, 1965, Ser. No. 508,684, now Patent No. 3,466,835, dated Sept. 16, 1969. Divided and this application Feb. 25, 1969, Ser. No. 825,471
Int. Cl. B65g 47/00
U.S. Cl. 198—20 R          12 Claims

ABSTRACT OF THE DISCLOSURE

A transfer machine for supplying a longitudinally forwardly moving main conveyor with products such as bread loaves wherein a sweep moving transversely to the conveyor moves bread loaves only to empty stations or spaces on the conveyor. Products such as bread loaves are fed only to empty stations on the main conveyor and the sweep is so timed with the movement of the advancing conveyor that the product is delivered to the empty station at precisely the time that the station passes a predetermined delivery location.

---

This invention relates to bakery product handling systems and more particularly to high speed transfer systems for transferring packaged bread and the like from packaging machinery to a single conveyor which delivers them to trays or baskets which can accommodate a plurality of loaves and thence to racks containing a plurality of trays or baskets which may then be loaded on delivery trucks or stored, if desired. In such systems a series of packaging machines must be operated to supply enough bread to keep the palletizing and racking equipment operating at the desired speeds.

This application is a division of U.S. application Ser. No. 508,684 now U.S. Pat. 3,466,835 granted Sept. 16, 1969 and entitled Bakery Product Handling System.

One of the prime objects of the invention is to design a completely automatic system for delivering packaged bread from a battery of packaging machines to a single conveyor.

Another object of the invention is to load packaged bread from a series of broadside packaging machines to a single conveyor in a manner such that bread delivered to the conveyor is always loaded to an empty space thereon.

Other objects and advantages of the invention will be pointed out specifically or will become apparent from the following description when it is considered in conjunction with the appended claims and the accompanying drawings, in which:

Figure 1:
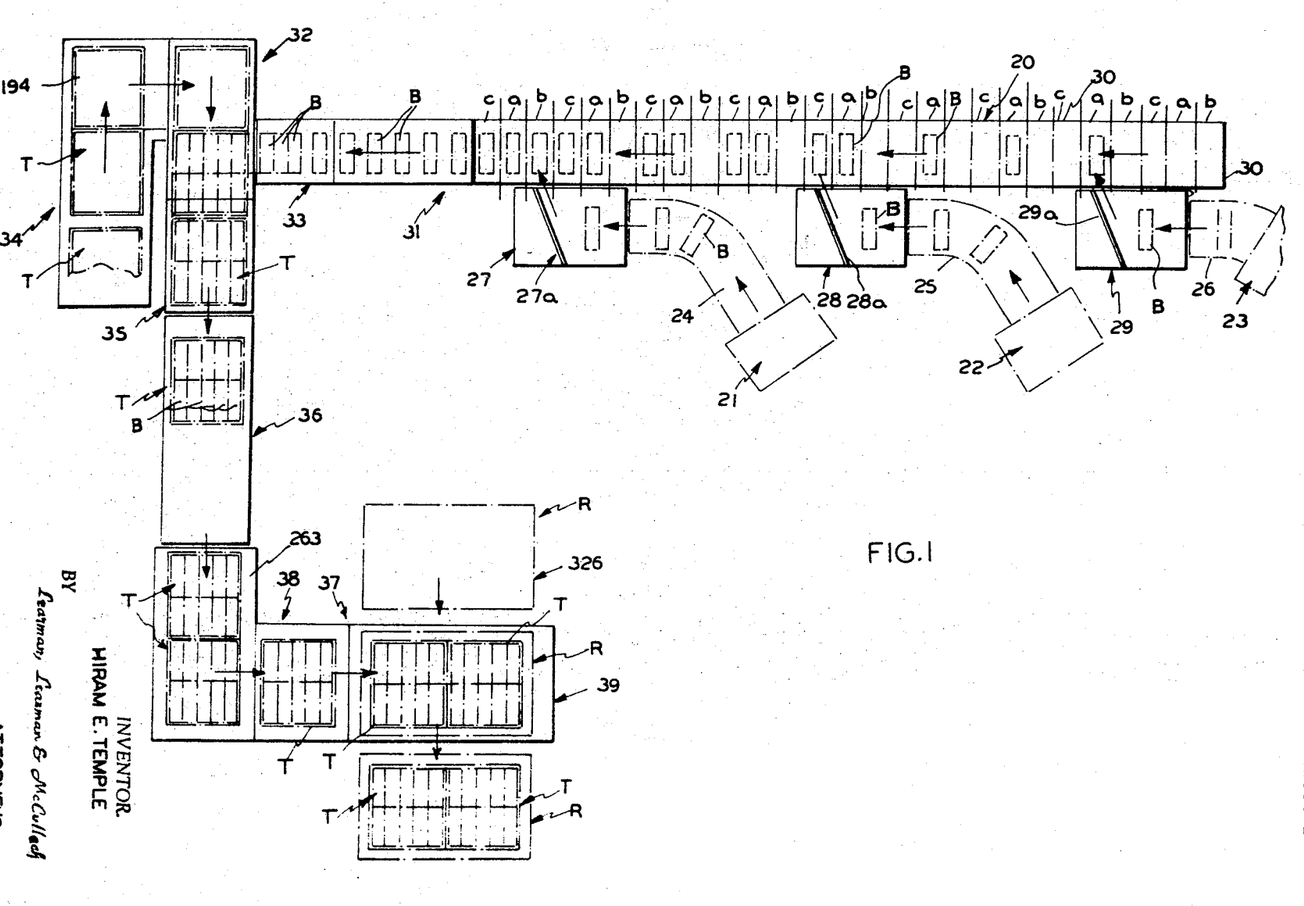
FIG. 1 is a schematic top plan view illustrating the entire bread handling system and showing the packaged bread loaves proceeding therethrough.

Referring now more particularly to the accompanying drawings, and in the first instance to FIG. 1, for a general description of a preferred embodiment of a system in which the invention may be employed only, a main conveyor generally designated 20 is shown as generally bridging or spanning a plurality of packaging machines generally designated 21–23 which have endless, powered discharge conveyors 24–26 leading to loaf depositing and positioning transfer machines generally designated 27–29 which are disposed in a longitudinal row adjacent the longitudinally extending main conveyor 20. In the present instance a trio of wrapping machines and transfer units is illustrated for purposes of convenience, but it is to be understood that more or fewer wrapping machines, or possibly bagging machines, may be utilized to feed individual bread loaves B or other packaged farinaceous products to the endless conveying surface 30 of the conveyor 20.

The conveyor 20 may be considered to be arbitrarily divided into a plurality of stations $a$–$c$ and the transversely extending chain lines are utilized for convenience sake to illustrate these stations on which bread loaves are to be deposited. While the stations $a$–$c$ in the embodiment of the invention illustrated herein are to receive single packaged bread loaves disposed crosswise to the longitudinal path of travel of the conveying surface 30, it is to be understood that the surface 30 may be divided into stations sufficiently large enough to accommodate a group of bread loaves with their longitudinal axes disposed in longitudinal parallelism with the surface 30. The transfer machines 27–29 are so correlated with the conveyor 20 that each feeds a bread loaf to one of the stations $a$–$c$ as the station passes the machine and in this manner each station $a$–$c$ on the conveyor 20 is provided with a bread loaf. The transfer machine 29, in other words, is operated at a predetermined speed relative to the speed of moving conveyor 20 and is timed to deliver a bread loaf to the spaces $a$ while the conveyors 27 and 28 are respectively delivering bread loaves to the spaces $b$ and $c$, respectively. Vertically disposed endless flight conveyors generally designated 27$a$, 28$a$, and 29$a$ arranged at an angle to the conveying surface 30 convey the bread B in a path which has a longitudinal as well as a transverse component. In this way, bread loaves can be supplied to a conveyor generally designated 31 with all of the spaces $a$–$c$ occupied and no problems are encountered with loaves being fed to spaces already occupied by other loaves.

The suitably powered endless conveyor 31, which preferably is operated at the same linear speed as conveyor surface 30, supplies a container loading machine generally designated 32 which includes an intake conveyor generally designated 33 and an empty container supplying conveyor generally designated 34. The containers, which in this instance comprise relatively shallow trays T, move on the conveyor 34 in the direction of the arrows to the rear of the container loading apparatus 32, which has a discharge conveyor surface generally designated 35. The containers T are moved forwardly beneath and beyond a platform on which incoming groups of loaves are supported and as the trays T pass beyond the platform the loaves are pushed from the platform and fall to the tray underneath. As shown particularly in FIG. 1, two groups of five loaves B each are loaded into each tray or container T by the loading device 32 and the loaded trays T proceed from the discharge conveyor 35 to a powered endless conveyor generally designated 36 which delivers them to a rack loading machine generally designated 37.

At the rack loading machine, empty skeleton-like racks generally designated R and comprising essentially corner support posts connected at their upper and lower ends and having therebetween a series of vertically spaced shelves are loaded with the trays T of bread. Each shelf is formed of a pair of horizontally spaced apart angle iron side strips which receive the filled trays T from a tray elevating mechanism generally designated 38. A rack positioning and holding mechanism generally designated 39 is provided to square up the racks R so that their shelf strips are in proper alignment with the similar shelves of the tray elevator apparatus 38. Once the shelves of the racks R have been filled with loaded trays, a pair of trays T being loaded at each level, the wheeled racks R may be simply loaded on a delivery truck. The invention claimed relates to the transfer units and only these will be described in detail. For a description of the entire system, attention is directed to the previously mentioned United States patent.

THE TRANSFER UNITS

Since each of the units 27–29 is identical, a description of one of the units will suffice. As shown particularly in FIGS. 1 and 2, the loaves of bread B are fed to the transfer machines 27–29 crosswise or broadside to the direction of travel in which they proceed from the wrapping machines 21–23. In the present instance, the conveyor 26 and transfer machine 29 will be described for the sake of convenience. The wrapping machine 23 may be considered to be a conventional wrapping machine of the character illustrated, for instance, in the Kilgard et al. U.S. Pat. No. 2,792,677, or the Waite U.S. Pat. No. 3,075,326, or may be a conventional loaf bagging machine such as the Mark 50 manufactured by Commodity Packaging Company, Inc., of Yakima, Wash., U.S.A. The conveyor 26 which delivers the packaged bread from the machines 23 may comprise a conventional gravity roll conveyor or could be a powered conveyor of the powered roll or endless surface type. Likewise, the powered conveyor 20 to which the machine 29 delivers the bread may comprise an endless rod type conveyor or endless belt type conveyor of conventional character.

Figure 4:
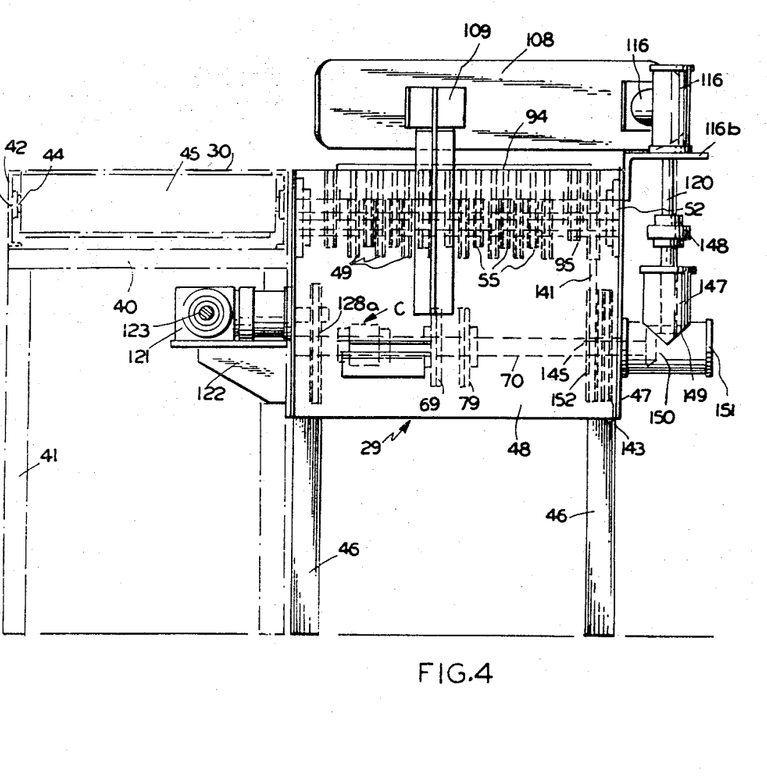
FIG. 4 is a right end elevational view of the machine shown in FIG. 2.

In FIG. 4 the conveyor 20 is disclosed as comprising longitudinally spaced horizontal supports 40 mounted on longitudinally spaced legs 41, the supports 40 mounting side rails 42 having bearings 43 journaling the shafts 44 of the end rollers 45 around which the endless support surface 30 is trained. As will later be described in detail, the conveyor 20 and transfer machines 27–29 are driven by the same motor, so that no problems of synchronization arise.

Figure 2:
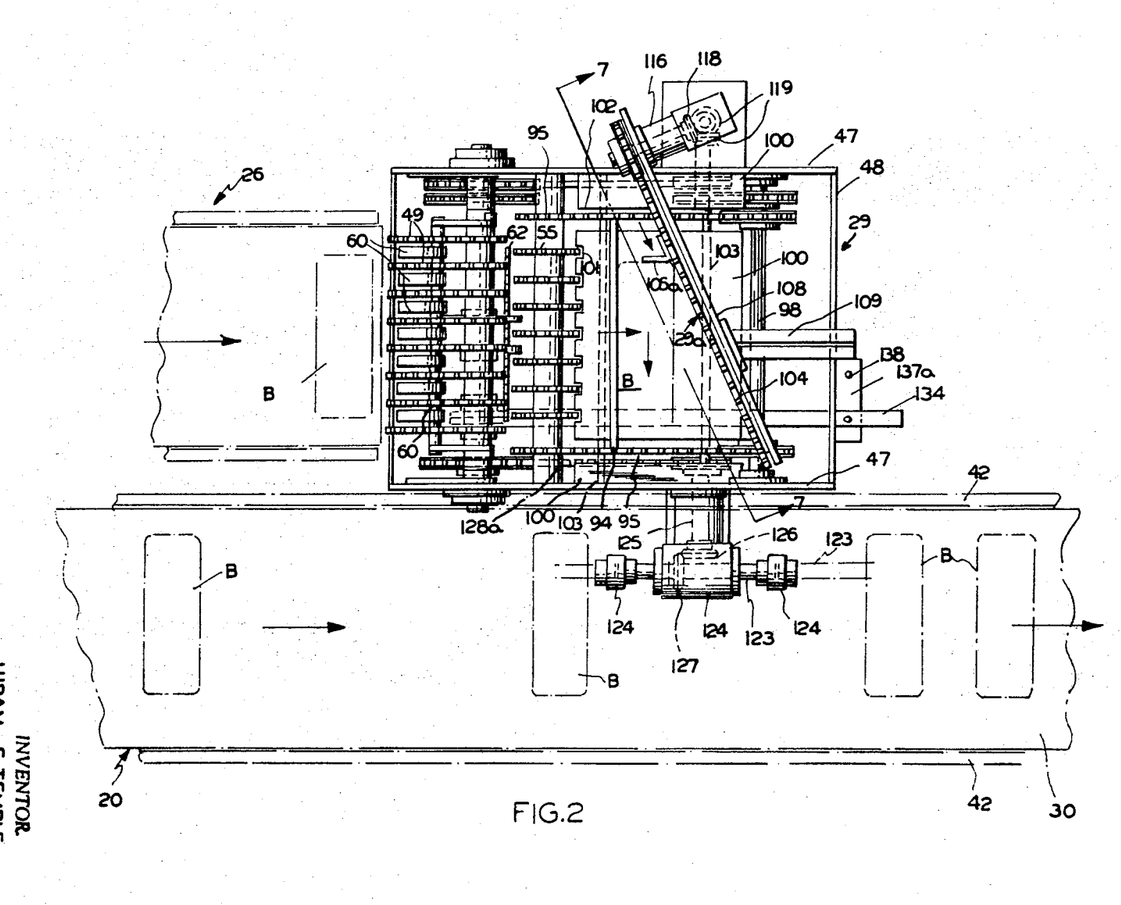
FIG. 2 is a top plan view of one of the transfer devices constituting the invention for moving bread loaves from a packaging machine to the main conveyor which delivers the loaves to the container loading device.
Figure 3:
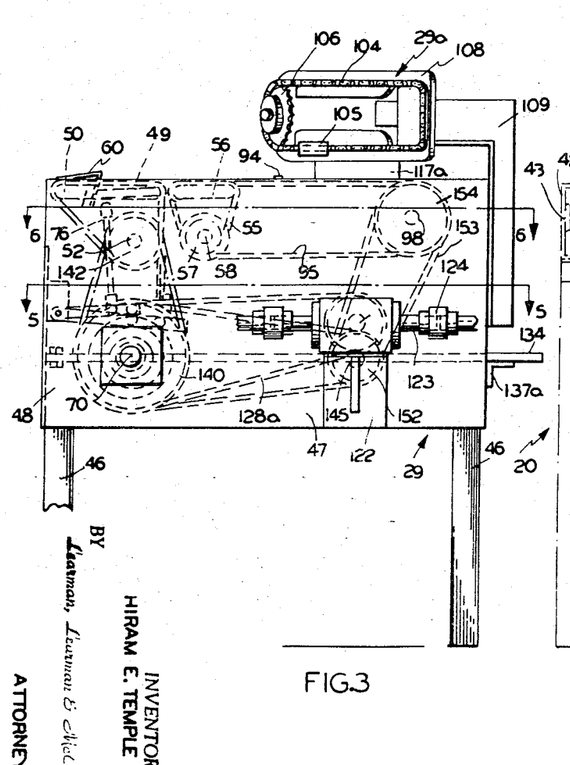
FIG. 3 is a left end elevational view of the transfer machine shown in FIG. 2.
Figure 6:
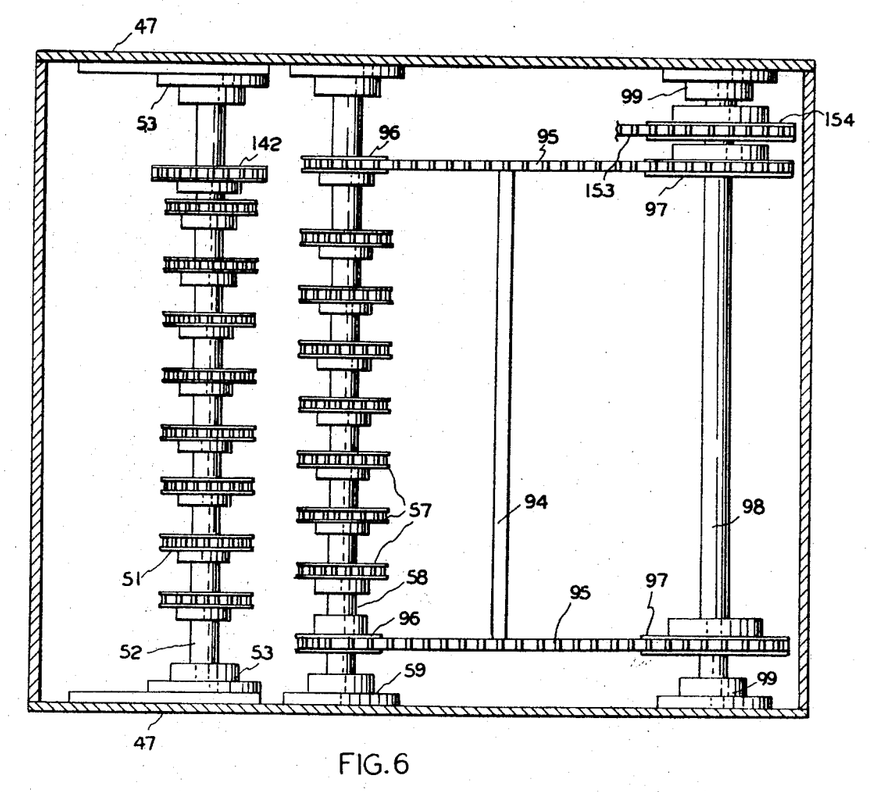
FIG. 6 is an enlarged, sectional top plan view taken on the line 6—6 of FIG. 3.
Figure 7:
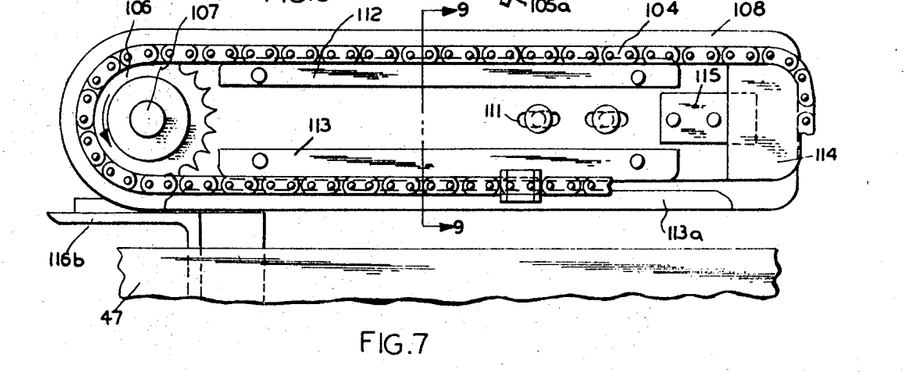
FIG. 7 is an enlarged, fragmentary, sectional side elevational view taken on the line 7—7 of FIG. 2.
Figure 8:
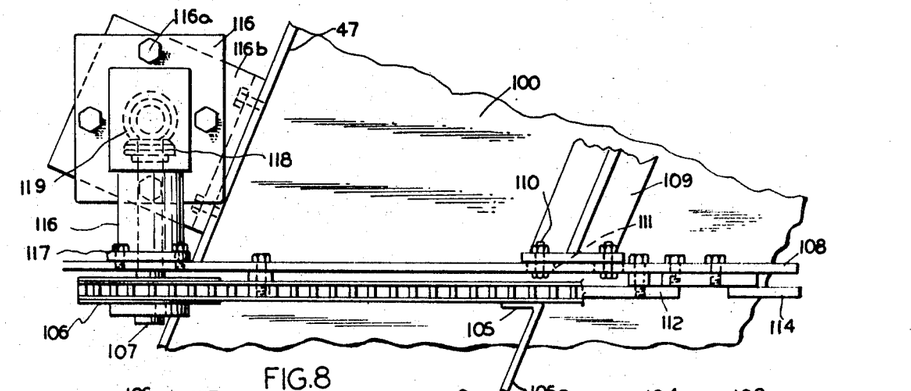
FIG. 8 is a top plan view of the mechanism shown in FIG. 7.
Figure 9:
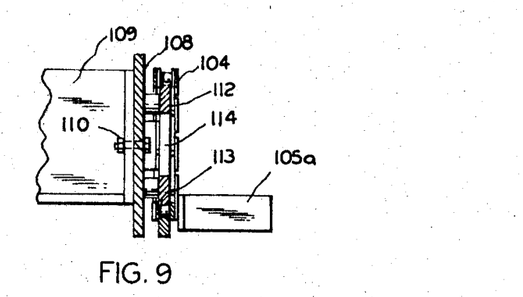
FIG. 9 is a transverse sectional view taken on the line 9—9 of FIG. 7.

As shown particularly in FIGS. 2–4, the transfer unit 29 comprises rectangularly arranged corner legs 46 for supporting side plate members 47 and front and rear end plate members 48 which form a box-like frame open at its upper and lower ends. Supported between the side frames 47 in transversely spaced apart relation adjacent the rear end of the machine are a series of endless conveyor chains 49 trained around upper guide members 50 and around lower sprockets 51 (see FIGS. 6 and 11) which are mounted in transversely spaced apart relation on a shaft 52 journaled in bearings 53 on the side walls 47. The chains 49 receive the bread loaves B from the conveyor 26 and, when permitted to do so, convey the bread loaves B forwardly toward the transversely inclined delivery conveyor generally designated 29a in FIG. 2 which transfers them to the main conveyor 20.

Forwardly of the conveyor chains 49 in the path of travel of the bread loaves B are a further series of transversely spaced endless conveyor chains 55 which are trained around upper guides 56 and around sprockets 57 fixed on a shaft 58 mounted in bearings 59 on the side walls 47. The chains 55 which receive the bread loaves B from the chains 49, when permitted to do so, are disposed out of longitudinal alignment with the chains 49 in positions generally intermediate chains 49.

Figure 11:
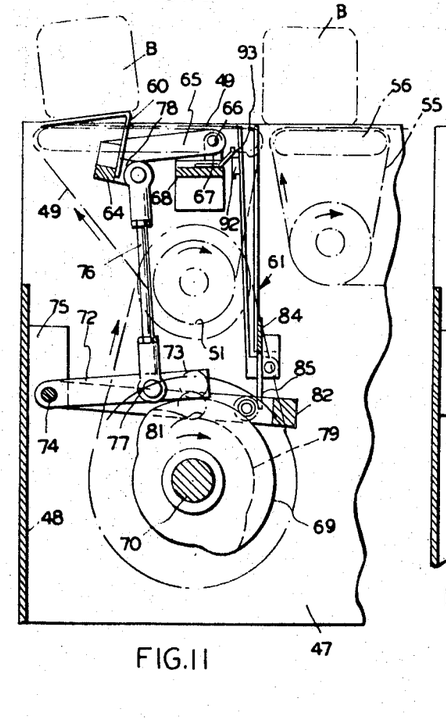
FIG. 11 is a fragmentary, transverse sectional view taken on the line 11—11 of FIG. 10 and showing the mechanism in one position.
Figure 12:
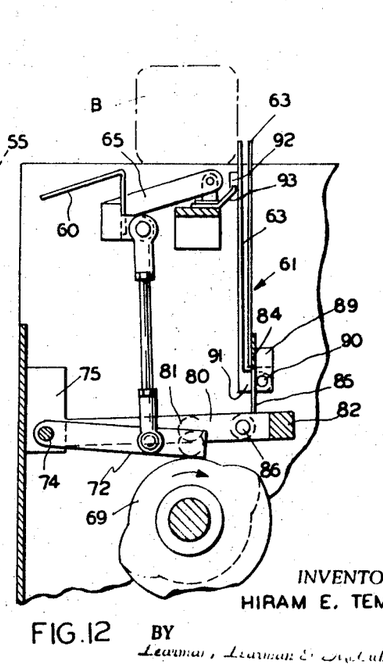
FIG. 12 is a similar view, showing the mechanism in still another operation position.

A series of angularly shaped elevator bars 60 are provided between the chains 49 and are mounted so as to be movable from the "down" position in which they are shown in FIG. 12, and in which they do not interfere with the travel of a bread loaf B on the chains 49, to a raised position in which, as shown in FIG. 11, they raise the bread loaf B sufficiently so that it is not in engagement with the chains 49 and is not carried forwardly by them.

A stop arm assembly generally designated 61 is provided between the chains 49, just forwardly of the second series of chains 55. This stop mechanism 61, which is illustrated particularly in FIG. 13 and will later be described in detail, includes laterally outer stop finger elements 62 and a more centrally located stop finger element 63.

Figure 10:
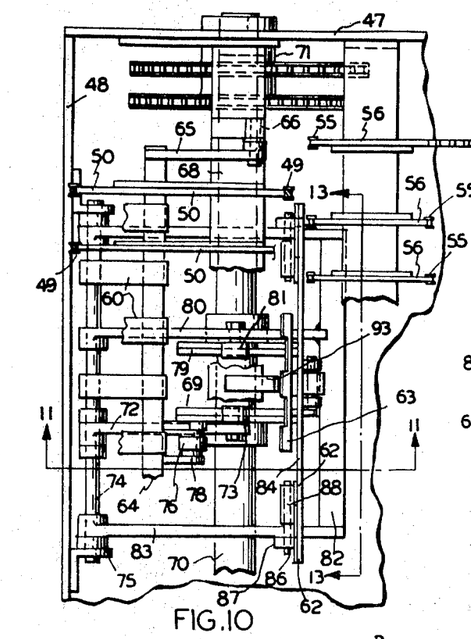
FIG. 10 is an enlarged, fragmentary, top plan view illustrating mechanism for insuring the proper delivery of the packaged bread loaves received by the transfer machine.

As shown particularly in FIGS. 10–12, the elevator bars 60 are mounted on a cross bar 64. At its ends the cross bar 64 is fixed to lever arms 65 which are pivotally mounted on pins or shafts 66 journaled in bearings 67 provided on a cross bar 68 spanning the side walls 47. A cam 69 mounted on a cam shaft 70 which is journaled in bearings 71 provided on the side frame members 47 is responsible for moving the elevator members 60 to raised position and permitting them to fall under the influence of the forces of gravity to a lowered position. Mounting a follower roller 73 which engages cam 69 is a cam follower arm 72 which is pivotally supported on a rod 74 as shown, the rod 74 being supported on the adjacent end wall 48 by brackets 75. A connecting rod 76 pivotally connected to the follower arm 72 at 77 and to clevis elements 78 extending from the elevator member cross support 64 moves the elevator support levers 65 upwardly under the influence of the cam 69.

Figure 13:
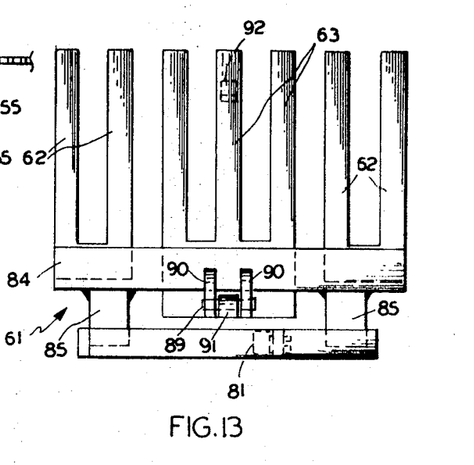
FIG. 13 is an enlarged, fragmentary, sectional view taken on the line 13—13 of FIG. 10.

Mounted on the cam shaft 70 is a second cam 79 which controls the stop finger assembly 61 through a second follower arm 80 which is similarly pivoted on the rod 74 and has a follower roller 81 in engagement with the cam 79. As shown in FIGS. 10–12, the stop finger assembly 61 is supported on a cam follower frame comprising a cross member 82 to which follower arm 80 is joined, the frame also including side bars 83 which are pivotally connected to the rod 74. A cross bar 84, to which the finger elements 62 are fixed, has dependent legs 85 connected to the cam follower frame side bars 83 by pins 86, the legs 85 having portions 87 and 88 which receive pins 86. As shown in FIGS. 12 and 13, the middle stop finger element 63 is pivotally mounted as at 89 on the stop assembly 61, there being clevis elements 90 fixed to the bar 84 for receiving the pin 89 which is mounted in a bearing 91 on the stop finger element 63.

Mounted on the pivotal stop finger element 63 which, as shown in FIGS. 11 and 12, leads the nonpivotally mounted outer stop finger elements 62 in the sense that it is first engaged by a bread loaf B, is an L-shaped latch member 92 adapted to engage over a latch finger 93 mounted on cross bar 68. As will later become apparent when the operation of the transfer unit 29 is described in detail, the latch 92 is released only when a loaf of bread B pushes the finger element 63 forwardly after the cam 79 has raised the latch 92 sufficiently to clear the latch finger 93. If no loaf of bread B is present to move the stop finger element 63 and latch 92 forwardly, latch 92 will simply drop back again to latched position when permitted to do so by cam 79.

From the conveyor chains 55 a loaf of bread B moves into the path of a longitudinally moving, transversely disposed transfer bar 94 mounted for endless travel by a pair of endless chains 95 trained around end sprockets 96 on the shaft 58 and around sprockets 97 on a shaft 98 which is journaled in bearings 99 provided near the front ends of the side plate members 47. The sweep bar 94 travels across a support surface 100 which leads to and beyond the delivery conveyor 54, and it will be noted that the rear edge of support surface 100 is notched as at 101 to pass the front ends of chains 55 and that the support surface structure is divided as at 102 to pass the chains 95. The side portions of support surface 100 (see FIG. 2) are connected with the middle portion thereof by transverse support braces 103.

The delivery conveyor 54 which cooperates with the sweep bar 94 to move the loaves B to the conveyor 20 comprises an obliquely extending, vertically disposed endless chain 104 on which is mounted an angular pusher element 105 (see FIGS. 2, 3, and 7-9) having a longitudinalily extending pusher bar 105a (see FIG. 2). The chain 104 is trained around a sprocket 106 which is fixed on a stub shaft 107 journaled on the conveyor supporting plate 108. Plate 108 is mounted on a bracket 109 secured to the front end plate 48, the plate 108 being adjustably secured to bracket 109 by bolts 110 extending through elongated slots 111 provided in the support 108. The chain 104 is also trained around upper and lower guides 112 and 113, respectively, and an end guide 114, all of which are secured to the vertical support plate 108. An intermediate support plate 115 secures to the plate 108 and carries end guide 114.

Mounted on the end of shaft 107, which extends through one portion of an elbow housing 116 bolted as at 117 to the plate 108 and on into the vertical portion of the elbow 116, is a bevel gear 118 which meshes with a mating bevel gear 119 on the upper end of a drive shaft 120. The lower end of elbow housing 116 is bolted as at 116a to a bracket 116b mounted on side plate 47. The manner in which shaft 120 is driven will presently be made clear.

Journaled in bearings 121 (see FIGS. 3 and 4) provided on gusseted support brackets 122 on a side plate 47 of each of the transfer machines is a main drive shaft 123 which may be directly connected to an electric motor 123a (see FIG. 16b) through a conventional Reeves variable speed device or the like (not shown). The various sections of the main shaft 123 may be connected by couplings 124 (see FIG. 2), and it is to be understood that the shaft 123 drives not only the conveyor 20 but also each element of the transfer units 27-29. At T-shaped housing 124 (see FIG. 5) is provided on a side wall 47 to house a takeoff shaft 125 having a bevel gear 126 in mesh with a bevel gear 127 provided on the shaft 123.

Mounted on the inner end of shaft 125 is a sprocket 128 which is connected with a sprocket 129 fixed on one jaw 130 of a clutch C, the clutch jaw 130 being journaled on shaft 70 and adapted to mesh with a mating clutch jaw 131 which is mounted for axial sliding movement on the shaft 70 by a pin 132 received in an axial slot 133 provided in the shaft 70 so that the clutch jaw 131 is axially slideable but rotatably fixed to the shaft 70. A lever arm 134 which may be connected to the clutch jaw 131 by the pin 132 is pivotally connected as at 135 to a bracket 136 provided on the one end wall 48 and at its opposite end extends out an opening 137 provided in the front end wall 48 and may be moved from the position in which it is shown in solid lines in FIG. 5 to the position in which it is shown in diagrammatic lines in FIG. 5 to mesh the jaw 131 with the jaw 130 and drive shaft 70. Provided on the front end wall 48 is a bracket 137a which supports the outer end of lever 134 and may include openings 138 for receiving a pin 139 on the lever arm 134 and so anchor the lever arm 134 in a position in which it either engages or disengages the clutch jaws 130 and 131.

Figure 5:
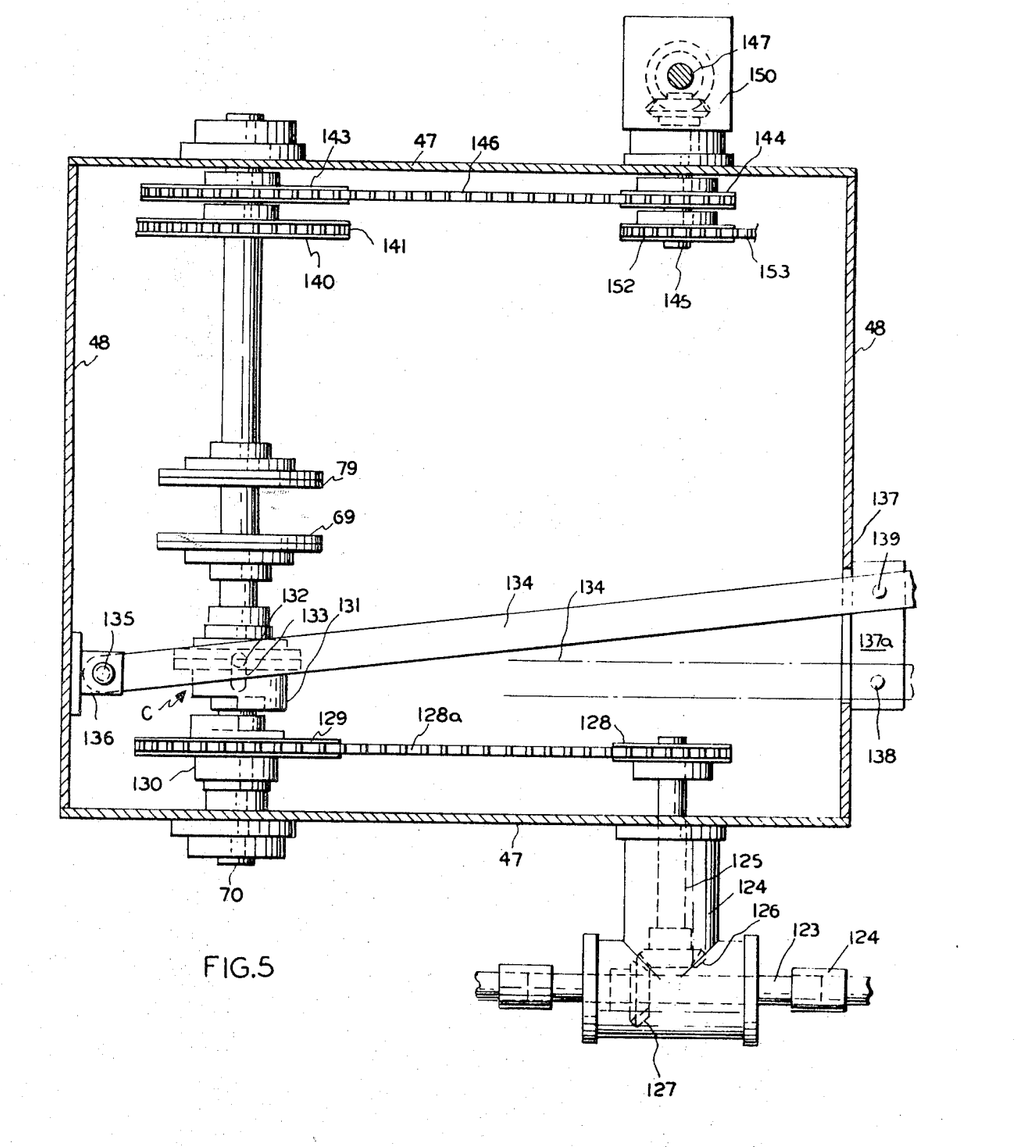
FIG. 5 is an enlarged, sectional top plan view taken on the line 5—5 of FIG. 3.

The shaft 70 of each of the units 27-29 functions as a main drive shaft for the unit and, as shown particularly in FIGS. 3 and 5, drives the shaft 52 through a sprocket 140 which is connected to the shaft 52 by means of a chain 141 trained around the sprocket 140 and around a sprocket 142 provided on the shaft 52. Also mounted on the shaft 70 is a sprocket 143 which drives a sprocket 144 provided on a stub shaft 145 by means of a chain 146. It is the shaft 145 which drives the shaft 120 powering the obliquely disposed delivery conveyor 54, through a shaft 147 which is coupled to the shaft 120 as at 148. Provided on the lower end of shaft 147 is a bevel gear 149 which meshes with a bevel gear 150 provided on the shaft 145, a T-shaped housing 151 bolted to side plate 47 being provided to house the elements, as shown particularly in FIG. 4. Also mounted on shaft 145 is a sprocket 152 which drives shaft 98 through a chain 153 and a sprocket 154 fixed on shaft 98.

In the operation of transfer unit 29, a bread load B from conveyor 26 is moved forwardly by the chains 49 when the elevator elements 60 are in lowered position, as shown in FIG. 12. The loaf B will be stopped initially by the central finger element 63 until the cam element 79 raises follower arm 80 to remove the latch 92 from the latch finger 93, and thereafter the central finger element 63 will be moved forwardly about pivot pin 89 by the pressure of the bread loaf B which is in engagement with chains 49, until the outer stop elements 62 are engaged. By engaging the central stop element 63 first of all, bread loaves B which may be skewed relative to the longitudinal path of travel tend to be squared up so that their longitudinal axis is perpendicular to the longitudinal path of the conveyor elements 49 and 55. As soon as the cam 79 permits, the stop elements 62 and 63 lower and the bread loaf B is advanced by the conveyor chains 55 into the path of the sweep bar 94.

As shown particularly in FIG. 2, the bread loaf B is moved forwardly by the sweep bar 94 to a position adjacent the delivery conveyor 54, and precisely at the time it reaches the position in which the forwardmost loaf B is shown in FIG. 2, the end of the loaf is engaged by the pusher arm 105a, the speeds of sweep bar 94 and pusher arm 105a being so coordinated that the bread is then moved forwardly and laterally at the same time to a station a on conveyor 20. By this time a second loaf B has been held up temporarily by the raised elevator elements 60 and then proceeded along the chains 49 into position to be halted by the stop assembly 61. The cam 69 is so configured that the elevator elements 60 prevent a third loaf from proceeding with the second loaf when the stop assembly 61 is lowered. As will be apparent from an inspection of the cam 79, the stop gate assembly 61 is only in raised position for a short period of time which is just sufficient to assure that the preceding loaf has cleared conveyor elements 55 before the next loaf B is released. Because the latch 92 will not be released, regardless of cam 79, if no bread loaf B is positioned against finger element 63, bread loaves B cannot pass beyond the conveyor chains 49 out of time.

As noted previously and shown particularly in FIG. 1, the endless surface 30 of the main conveyor belt 20 is divided into imaginary stations a-c of equal longitudinal extent in the direction of movement of the bread loaves B and the transfer unit 29 feeds bread loaves only to the spaces a, the transfer machine 28 feeds bread loaves only to the spaces c, and the transfer unit 27 feeds bread loaves B only to the spaces b. This is possible because the units 27-29 are driven in timed relation with the main conveyor unit 20 and because the timing is controlled by the latch 92, regardless of the random manner in which the packaging machines may supply loaves of bread B to the transfer units 27-29. Each delivery is controlled by the requirement that there be a bread loaf B in position against the stop element 63, as well as the requirement that the cam 79 be in a position to raise the stop assembly 61 in order for the latch 92 to release. Thus, at the time that cam 79 would otherwise permit release of the latch 92, a bread loaf B which was not in time in the sense that it had not quite yet reached the stop element 63 would not cause the release of latch 92 and such a bread loaf would not be released until the next time the cam 79 was again in a proper position.

It is to be understood that the drawings and descriptive matter are in all cases to be interpreted as merely illustrative of the principles of the invention rather than as limiting the same in any way, since it is contemplated that various changes may be made in the various elements to achieve like results without departing from the spirit of the invention or the scope of the appended claims.

I claim:

1. Apparatus for supplying a longitudinally forwardly moving main conveyor with products such as bread loaves comprising: advancing conveyor means for moving the loaves longitudinally parallel to said main conveyor; a diverting conveyor, operating conjunctively with said advancing conveyor means, extending at a skewed angle toward said main conveyor for moving loaves thereto, in a path having a forward longitudinal component and a lateral component; stop means movable from a lowered position to raised position to stop loaves on the advancing conveyor means; cam means timed with the main conveyor and diverting conveyor operable to release said stop means at predetermined intervals; and latch means provided for holding said stop means in raised position, even though it is released by said cam means, if no loaf is pressing against said stop means.

2. The combination defined in claim 1 in which said stop means includes a central stop element, pivotal on said stop means, and said latch means is mounted thereon; and a keeper over which said latch means engages and from which the latch means is raised when said cam means raises said stop means but over which said latch means reengages when the stop means is lowered if a loaf has not pivoted said central stop element relative to said stop means.

3. Apparatus for supplying a longitudinally forwardly moving main conveyor with products such as bread loaves comprising: advancing conveyor means for moving the loaves generally longitudinally parallel to said main conveyor; a transfer member movable angularly relative to said advancing conveyor means for moving loaves across to said main conveyor; stop means movable from a lowered position to a raised position to stop loaves on the advancing conveyor means; stop control means timed with the transfer member to release said stop means; and means provided for holding said stop means in raised position, even though it is released by said stop control means, if no loaf is in position to engage said stop means.

4. In combination with a longitudinally forwardly continuously moving main conveyor which is partly filled with packaged bread loaves but has available empty spaces thereon to be filled; advancing conveyor means for moving loaves from a packaging machine to the main conveyor and including a waiting station portion; said advancing conveyor means incorporating mechanism comprising sensing means for sensing the presence of loaves at said waiting station and pusher means movable relatively to said main conveyor to aid in delivering bread loaves from said waiting station to said main conveyor; said sensing means and pusher means mechanism being operative to delay loaves and deliver them in timed relation to the speed of travel of said main conveyor to deliver bread to available empty spaces at the time the spaces pass past the advancing conveyor means.

5. In combination with a longitudinally forwardly moving accumulating conveyor having a continuously moving conveying surface which is partly filled with products such as packaged bakery products but has available empty spaces thereon to be filled; advancing conveyor means for moving loaves to the accumulating conveyor and including a waiting station portion; mechanism comprising sensing means for sensing the presence of products at said waiting station portion and pusher means movable in timed relation to said conveying surface to aid in delivering products from said waiting station portion to said accumulating conveyor; said mechanism being operative to delay products and to deliver products, in timed relation to the speed of travel of said accumulating conveyor surface and the availability of empty spaces thereon, to available empty spaces at substantially the time the spaces pass past the advancing conveyor means.

6. The combination defined in claim 5 in which said advancing conveyor means is disposed at substantially the level of said accumulating conveyor; and said transfer moves transversely to the advancing conveyor means and accumulating conveyor across the advancing conveyor means in a path extending to at least the side of the accumulating conveyor to deliver bread loaves onto said accumulating conveyor.

7. The combination defined in claim 5 in which a plurality of said advancing conveyor means and said sensing means and pusher means mechanisms are provided along said conveying surface and collectively operate to fill empty spaces between said products to normally substantially fill said accumulating conveyor surface; said plurality of advancing conveyor means each being in communication with a product packaging machine.

8. Apparatus for supplying a longitudinally forwardly moving main conveyor which is partly filled with packaged bread loaves or like products as it moves past a filling station but has available empty spaces thereon to be filled comprising: adjacent advancing conveyor means comprising a filling station disposed at substantially the level of the main conveyor and including means for moving the loaves longitudinally parallel to the main conveyor; and a sweep movable at an angle to the main conveyor across the adjacent advancing conveyor means in a path extending to at least the side edge of the main conveyor to deliver products onto said main conveyor; means operable in correlation with said sweep for holding up the travel of loaves along said advancing conveyor means; and control means for operating said sweep in timed relation to the approach of empty spaces on said main conveyor to deliver bread to available empty spaces at the time the spaces pass the sweep.

9. The combination defined in claim 8 in which said advancing conveyor means includes at least a pair of in line front and rear endless advancing conveyor portions; said means for holding up the travel of loaves includes a loaf halting member disposed adajacent them and movable to withdrawn and blocking positions; and means timed with the operation of said sweep moves said loaf halting member to withdrawn position.

10. The combination defined in claim 9 in which said loaf halting member is mounted for raising and lowering movement; and means is provided in the path of movement of loaves on said rear conveyor portion for controlling movement of the loaf halting member when no loaf is contacting said means.

11. The combination defined in claim 10 in which another endless conveyor feeds loaves to said rear conveyor portion; and elevator bar means, disposed upstream of said front and rear conveyor portions and timed to operate in timed relation with said sweep, are periodically raised to move loaves above said rear conveyor portion.

12. In combination with a longitudinally forwardly moving accumulating conveyor which is partly filled with packaged bread loaves or like products as it moves past a filling station, but has available empty spaces thereon to be filled; means for continuously moving said accumulating conveyor; advancing conveyor means, comprising said filling station, for moving the products to the accumulating conveyor, disposed adjacent the accumulating conveyor; said advancing conveyor means incorporating a pusher movable to deliver products onto said accumulating conveyor; means for delaying the travel of products on said advancing conveyor means to be transferred by said pusher; and control means for operating said pusher in timed relation to the availability of empty spaces on said accumulating conveyor to deliver products to available empty spaces at substantially the time the spaces pass the station.

References Cited
UNITED STATES PATENTS

| | | | |
|---|---|---|---|
| 2,616,550 | 11/1952 | Rowe | 198—34 X |
| 2,848,098 | 8/1958 | Talbot | 198—34 X |
| 2,771,177 | 11/1956 | Cutter et al. | 198—34 |
| 2,842,254 | 7/1958 | Schramn | 198—34 |

RICHARD E. AEGERTER, Primary Examiner

D. D. WATTS, Assistant Examiner

U.S. Cl. X.R.

198—34, 21, 79